(12) United States Patent
Bonja

(10) Patent No.: US 6,765,657 B2
(45) Date of Patent: Jul. 20, 2004

(54) METHOD OF TESTING OPTICAL FIBERS

(75) Inventor: Jeff Bonja, Sturbridge, MA (US)

(73) Assignee: Molex Incorporated, Lisle, IL (US)

( * ) Notice: Subject to any disclaimer, the term of this patent is extended or adjusted under 35 U.S.C. 154(b) by 132 days.

(21) Appl. No.: 10/052,939

(22) Filed: Oct. 29, 2001

(65) Prior Publication Data

US 2003/0081198 A1 May 1, 2003

(51) Int. Cl.$^7$ ............................................... G01N 21/00
(52) U.S. Cl. ....................................................... 356/73.1
(58) Field of Search ........................... 356/73.1; 385/12, 385/24, 115; 250/227.12–227.27

(56) References Cited

U.S. PATENT DOCUMENTS

| 4,738,529 A | 4/1988 | Hug |
| 4,827,317 A | 5/1989 | Mizushima et al. |
| 5,078,489 A | 1/1992 | Lieber |
| 5,263,109 A | * 11/1993 | Abe et al. ................ 385/115 |
| 5,936,719 A | 8/1999 | Johnson |
| 6,028,661 A | 2/2000 | Minami et al. |

FOREIGN PATENT DOCUMENTS

JP          11-295569          * 10/1999

* cited by examiner

Primary Examiner—Tu T. Nguyen
(74) Attorney, Agent, or Firm—Romi N. Bose

(57) ABSTRACT

A method of testing optical fibers includes: providing at least two optical fibers; transmitting a light at a first end of the at least two optical fibers; measuring a light transmission time for each of the at least two optical fibers; determining a difference in the light transmission times for the at least two optical fibers; and determining whether the difference in light transmission times is above a predetermined value.

22 Claims, 3 Drawing Sheets

METHOD OF TESTING OPTICAL FIBERS

BACKGROUND

The present invention relates generally to optical fibers and, more specifically, to the testing of skew in optical fibers.

Data, such as Voice Data, Image Data or the like are typically handled using computers that transfer the relevant information in a digitized form through electric cables, fiber optic cables, radio frequency transmission or the like. Increasing demand for digitally transferred information has driven research in the area of fiber optics. Throughput of digital data in optical fibers depends on the speed of the signal, the number of signals that can be simultaneously transferred using different wavelengths (i.e., the bandwidth), and the frequency of the individual signals. Since optical fibers use light pulses to form digital signals, the signal speed is already at a maximum (i.e., the speed of light). While the transmission of multiple simultaneous signals having different wavelengths through a single optical fiber is possible, the high cost of light emitters capable of sending out such signals currently makes this approach uneconomical. Accordingly, digital data throughput in optical fibers has been increased by increasing the frequency of individual signals.

However, as signal frequency increases, errors caused by the skew in fiber optic cables has become a concern. In fiber optic cables including at least two optical fibers, differences in light transmission times between individual optical fibers, also referred to as skew, can occur. For computers having sufficiently fast processing speeds, skew can result in errors in the interpretation of transmitted digital data.

In an attempt to prevent excessive skew in fiber optic cables, it is common to select individual optical fibers having a desired light transmission time and to bundle the appropriate optical fibers together to form a fiber optic cable. Unfortunately, this method of forming fiber optic cables has the drawback that skew can be introduced into the fiber optic cable during the process of assembling the individual optical fibers into a fiber optic cable. Thus, even when starting with individual optical fibers having acceptable light transmission times, the resulting fiber optic cable can have excessive skew, i.e., can have optical fibers which exhibit too great a difference in their respective light transmission times. Another drawback is the manufacturing inefficiency resulting from having to select each individual optical fiber for use in a single fiber optic cable prior to assembling the fiber optic cable.

What is needed, but is not provided by the conventional art, is a method of testing and adjusting the skew of a fiber optic cable, or a group of optical fibers, that allows greater manufacturing efficiency when producing fiber optic cables.

SUMMARY

Briefly stated, one embodiment of the present invention is directed to a method of testing optical fibers. The method includes: providing at least two optical fibers; transmitting a light at a first end of the at least two optical fibers; measuring a light transmission time for each of the at least two optical fibers; determining a difference in the light transmission times for the at least two optical fibers; determining whether the difference in light transmission times is above a predetermined value; and if the difference in the light transmission times is above the predetermined value, adjusting an amount of optical material forming at least one of the at least two optical fibers to reduce the difference in the light transmission times.

Another embodiment of the present invention is directed to a method of testing a fiber optic cable. The method includes: providing a fiber optic cable having a first and second end, the fiber optic cable including at least two optical fibers; transmitting light at the first end of the fiber optic cable; measuring the light transmission time for the light to travel through each of the at least two optical fibers of the fiber optic cable; determining the difference in the light transmission times for the at least two optical fibers of the fiber optic cable; and determining whether the difference in the light transmission times is above a predetermined value.

BRIEF DESCRIPTION OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings.

DETAILED DESCRIPTION OF THE PREFERRED EMBODIMENTS

Referring to FIGS. 1–5 in detail, wherein like numerals designate like elements throughout, there is shown a system for testing optical fibers or a fiber cable, generally designated 1. Generally speaking, the present invention is directed to detecting skew and, if appropriate, eliminating at least some of the difference in the light transmission times of the optical fibers 10 that will be used in a single fiber optic cable or application. By reducing the difference in light transmission times, errors in the processing of digital information by highspeed computer processors can be reduced or eliminated.

Figure 1:
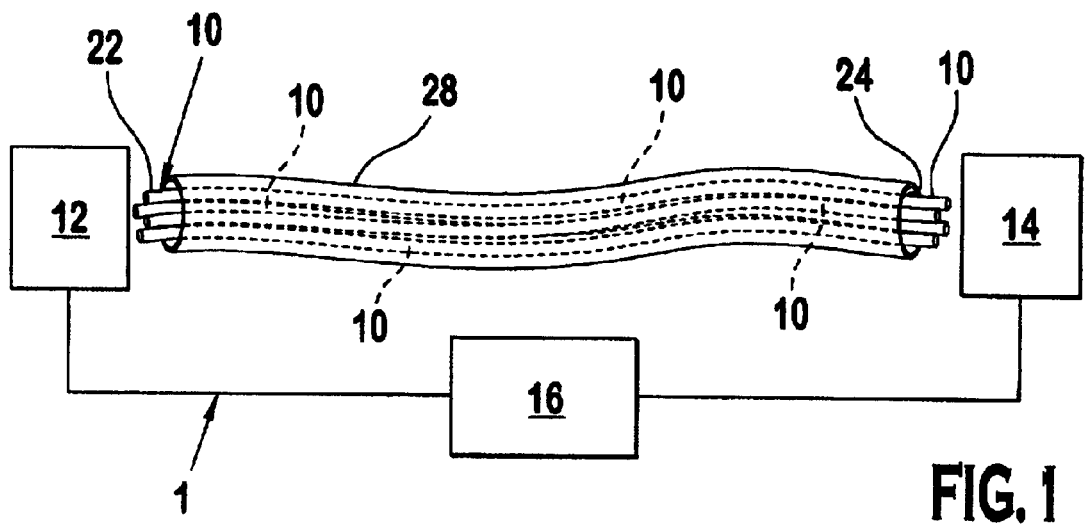
FIG. 1 is a schematic diagram of a system for testing at least two optical fibers according to the preferred embodiment of the present invention.

FIG. 1 illustrates a preferred system for testing optical fibers 10 or fiber optic cables 28. It is preferred that a light signal generator 12 be optically connected to a first end 22 of the first optical fiber 10 being tested and that an optical detector 14 be optically connected to a second end 24 the optical fiber 10. After the light transmission time through the optical fiber 10 being tested is measured, the light signal generator 12 and optical detector 14 are switched to the next optical fiber 10. If desired, multiple light signal generators 12 and optical detectors 14 can be attached to the optical fibers 10 to allow simultaneous measurement of light transmission times. The preferred light signal generator for use with the present invention is any optical pulse generator capable of providing a rise time of less than twenty (20) picoseconds. The preferred optical detector for use with the present invention is a high speed photo receiver having a rise time compatible with that of the pulse optical generator. The light signal generator 12 and the optical detector 14 are preferably controlled and operated by a control system 16. It is preferred that the control system 16 be a digital sampling oscilloscope having a bandwidth greater than twenty (20) gigahertz and a rise time of less than twenty (20) picoseconds. Those of ordinary skill in the art will appreciate from this disclosure that other suitable light signal generators 12, optical detectors 14, and control systems 16 can be used without departing form the scope of the present invention.

A method of testing at least two optical fibers 10 according to the present invention includes providing at least two optical fibers 10. The optical fibers 10 are preferably formed by thin, flexible filaments having a diameter of 10–60 microns. The interior (not shown) of the optical fiber 10 preferably consists of a high refractive index optical glass and is surrounded by a sheath (not shown) of glass having a lower refractive index. The optical fibers 10 in the present invention can be produced using a drawing process or by any other known process for forming optical fibers 10.

Figure 4:
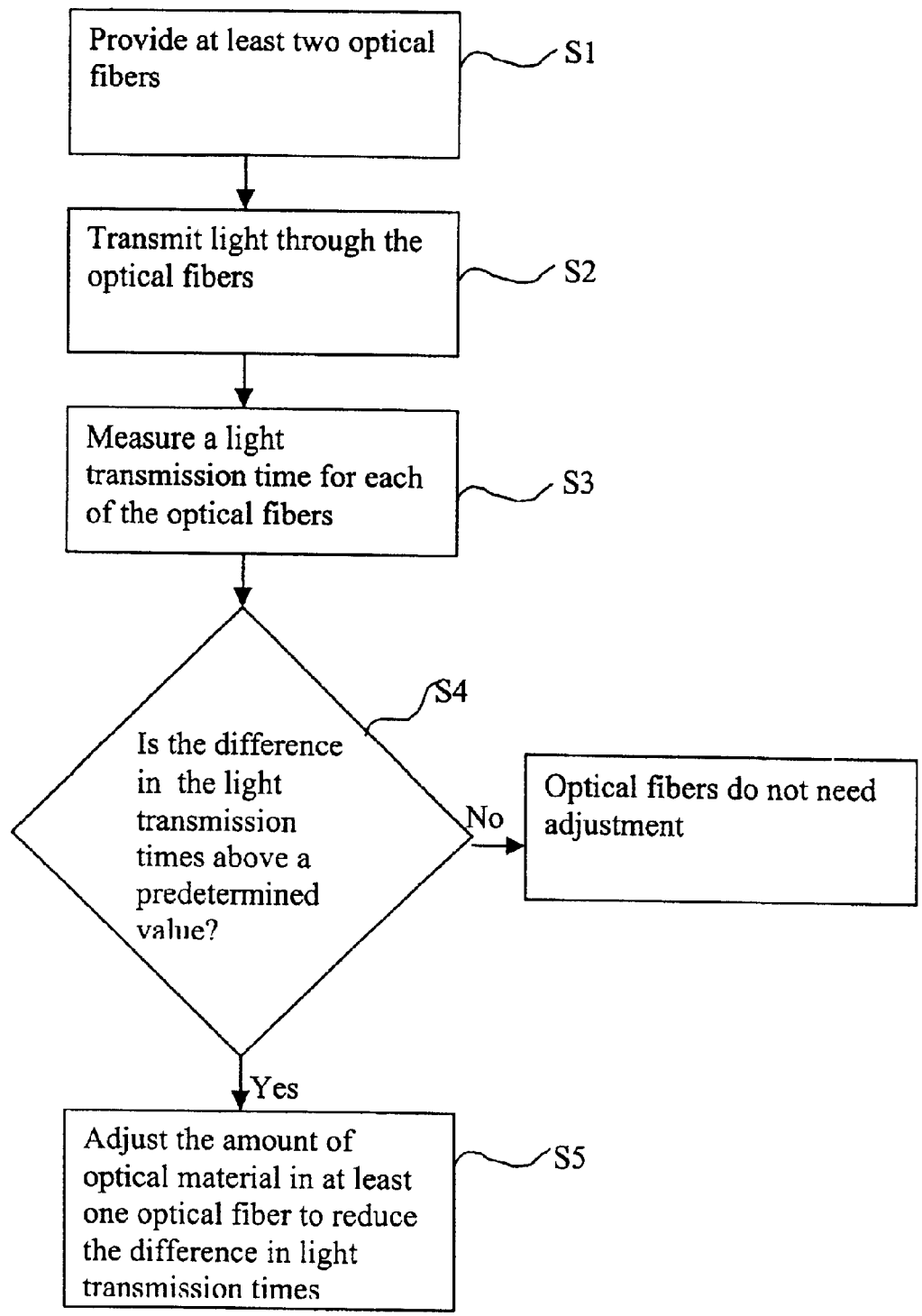
FIG. 4 is a flow chart of a method of testing at least two optical fibers according to the present invention.

Referring to FIG. 4, a method of testing optical fibers 10 according to the present invention includes the step of transmitting light at the first end 22 of the at least two optical fibers 10. It is preferable, that the step of transmitting light includes transmitting light having a predetermined wavelength. It is also preferable that the step of transmitting light include optically connecting the light signal generator 12 to the first end 22 of the at least two optical fibers 10.

The testing of optical fibers according to the present invention includes the step of measuring a light transmission time for each of the at least two optical fibers 10. The light transmission time for each optical fiber 10 is the amount of time necessary for a light signal to travel the length of the respective optical fiber 10. Accurate measurement of light transmission times is preferably performed by the control system 16 which activates and monitors the light signal generator 12 and the optical detector 14. It is preferred that the method of testing optical fibers 10 include optically connecting the optical detector 14 to the second end 24 of the at least two optical fibers 10. Alternatively, the measuring of light transmission times can be performed by connecting a second end 24 of each of the optical fibers 10 to an optical detector 14 without departing from the scope of the present invention.

The testing of optical fibers 10 according to the present invention includes determining a difference in the light transmission times for the optical fibers 10. The difference in light transmission times is obtained by subtracting the shortest light transmission time from the longest light transmission time for the at least two optical fibers 10.

The testing of optical fibers 10 according to the present invention also includes determining whether the difference in light transmission times is above a predetermined value. The particular predetermined value for a specific optical fiber 10 depends on the application for which the optical fiber 10 will be used. For example, when optical fibers 10 are to be used with computer systems having relatively slow processor speeds, a greater difference in light transmission times can be tolerated without generating errors in the received data. However, when optical fibers 10 are used in computer systems having relatively fast processor speeds, reducing differences in light transmission times is beneficial in reducing digital processing errors. The methods of the present invention provide more efficient and economical methods of producing fiber optic cables 28, or groups of optical fibers 10, having a reduced amount of skew (i.e., a smaller difference in the light transmission times for the relevant optical fibers 10).

If the difference in light transmission times is above the predetermined value, the testing of optical fibers 10 according to the present invention includes the step of adjusting an amount of optical material forming at least one of the optical fibers 10 to reduce the difference in the light transmission times. The difference in light transmission times can be reduced by increasing the amount of optical material present in the optical fiber(s) 10 having the fastest light transmission time. This results in the light transmission speed of optical fibers 10 used in a common application being reduced closer to that of the slowest light transmitting optical fiber 10. Alternatively, the difference in transmission times can be reduced by removing optical material from the optical fiber 10 having the longest transmission time. To remove fiber optic material, an optical fiber segment 20 of a predetermined length is removed from the optical fiber 10 being adjusted. This results in the shortened optical fiber(s) having a faster light transmission time and causes the light transmission speed of the optical fibers 10 used in a common application to be increased closer to that of the optical fiber 10 having the fastest light transmission time.

Figure 2:
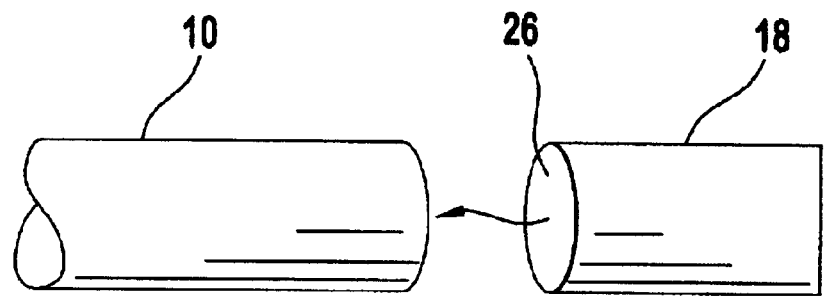
FIG. 2 is a side elevational view of an optical fiber segment being attached to one of the optical fibers of FIG. 1.
Figure 3:
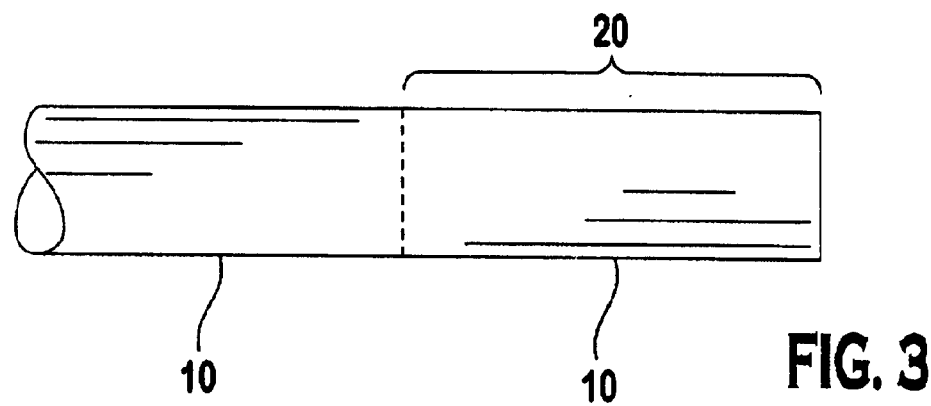
FIG. 3 is a side elevational view of one of the optical fibers of FIG. 1 illustrating a length of the optical fiber segment to be removed from the optical fiber.

Referring to FIG. 2, it is preferable that the testing of optical fibers 10 according to the present invention include the step of determining a length of an optical fiber segment 18 to be added to one of the at least two optical fibers 10 having a relatively shorter light transmission time as compared to the optical fiber 10 having the longest light transmission time. The step of determining the length of the optical fiber segment 18 preferably includes selecting an optical fiber segment 18 having the same index of refraction (for both the core and the cladding) as the optical fiber 10 being adjusted and having a length determined by the formula:

$$X = (L/TT) \cdot \Delta T$$

In the above equation, "X" represents the length of the optical fiber segment 18 to be added to the optical fiber 10 being adjusted. "L" represents the length of the optical fiber 10 being adjusted. "TT" represents the light transmission time of the optical fiber 10 being adjusted. "$\Delta T$" represents the time difference between the light transmission time of the optical fiber 10 being adjusted and the optical fiber 10 having the longest transmission time. Thus, by adding an optical fiber segment 18 having a length determined by the above equation, skew in the optical fibers 10 is compensated. The ease in testing and reducing skew in optical fibers 10 using the method of the present invention allows optical fibers 10 to be grouped for a particular application prior to testing the optical fibers 10 for their respective transmission times. Subsequent to determining the respective transmission times of the grouped optical fibers 10, optical material can be added as necessary. This greatly improves manufacturing efficiency for producing fiber optic cables 28 or grouped optical fibers 10.

Alternatively, when performing the method of the present invention, the amount of optical material can be adjusted using an optical fiber segment 18 having a different index of refraction from that of the optical fiber 10 being adjusted. It may be advantageous to add an optical fiber segment 18 having a different index of refraction when the use of a shorter optical fiber segment 18 is desired for a particular application. When an optical fiber segment 18 having a different index refraction is added to the optical fiber 10 being adjusted, it is preferred that an anti-reflective coating 26 be located between the optical fiber 10 being adjusted 10 and the optical fiber segment 18. The anti-reflective coating 26 reduces reflected light at the transition between the optical fiber 10 and an optical fiber segment 18 having a different index of refraction from the optical fiber 10.

It is preferred that the length of the optical fiber segment 10, which has a different index of refraction from the optical fiber 10 to which it will be added, be determined by the formula:

$$X = c \cdot n_2 \cdot \Delta T.$$

In the above equation, "X" represents the length of the optical fiber segment 18 to be added to the optical fiber 10 being adjusted. "$n_2$" represents the group index of refraction of the optical fiber segment. "$\Delta T$" represents the time difference between the light transmission time of the optical fiber 10 being adjusted and the optical fiber 10 having the longest transmission time. "c" represents the speed of light in a vacuum.

The method of the present invention may include selecting an optical fiber segment 18 for which the quantity $L_2/TT_2$ is known. When selecting an optical fiber segment 18 for which the quantity $L_2/TT_2$ is known, the length of the optical fiber segment 18 is preferably determined by the formula:

$$X = (L_2/TT_2) \cdot \Delta T.$$

In the above equation, "X" corresponds to the length of the optical fiber segment 18 to be added. $L_2$ is a length of the optical fiber (from which the optical fiber segment 18 is cut) when the optical fiber was measured to determine the quantity $L_2/TT_2$. "$TT_2$" is the light transmission time of the optical fiber (from which the optical fiber segment 18 is cut) when the optical fiber 10 was measured to determine the quantity $L_2/TT_2$. "$\Delta T$" is the time difference between the light transmission time of the optical fiber 10 being adjusted and the optical fiber 10 having the longest light transmission time.

To reduce the overall light transmission time of at least one of the optical fiber 10 being used for a particular application, the method of the present invention may include the step of determining a length of optical fiber 10 to be removed from an optical fiber 10 having a relatively longer light transmission time as compared to the optical fiber 10 having the shortest light transmission time. It is preferred that the length of optical fiber 20 to be removed from the optical fiber 10 being adjusted is determined by the formula:

$$X_R = (L/TT) \cdot \Delta T_2.$$

In the above equation, "$X_R$" is the length 20 of the optical fiber 10 to be removed from the one of the optical fibers 10. "L" is the length of the optical fiber 10 being adjusted. "TT" is the light transmission time of the optical fiber 10 being adjusted. "$\Delta T_2$" is the time difference between the light transmission time of the optical fiber 10 being adjusted and the optical fiber 10 having the shortest light transmission time.

Figure 5:
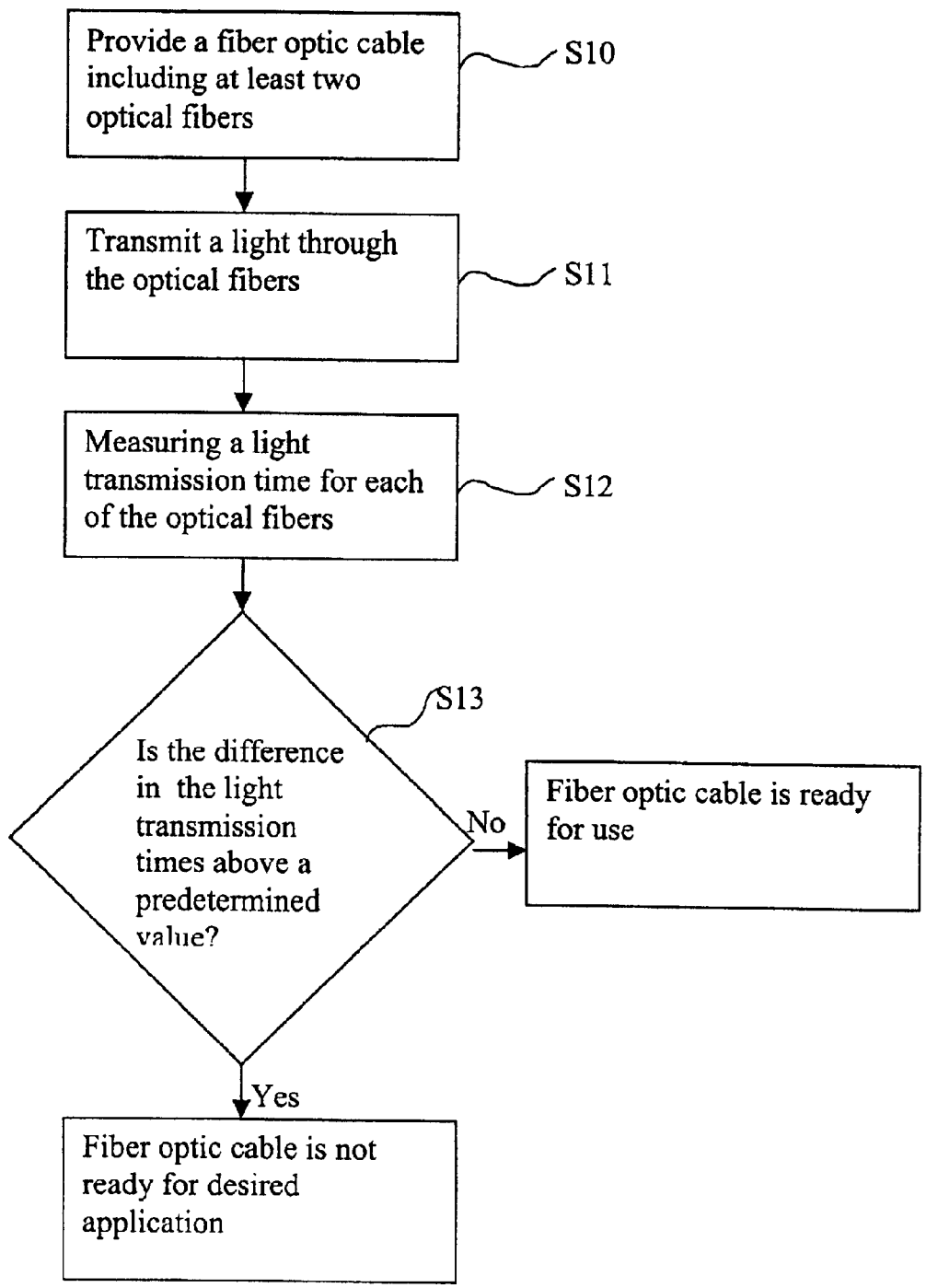
FIG. 5 is a flow chart of a method of testing a fiber optic cable according to the present invention.

Referring to FIG. 5, the second preferred method of testing optical fibers 10 preferably tests the optical fibers 10 after the optical fibers 10 have been assembled into a fiber optic cable 28. This prevents the introduction of skew, due to the assembly of the fiber optic cable 28, after the optical fibers 10 have been tested. The second preferred method of the present invention includes providing a fiber optic cable 28 including at least two optical fibers 10; transmitting a light at the first end of the fiber optic cable 28; measuring a light transmission time for each of the optical fibers 10; determining a difference in the light transmission times for the optical fibers 10 of the fiber optic cable 28; and determining whether the difference in the light transmission times is above a predetermined value. Contrary to the first preferred method of the present invention, the step of adjusting the amount of optical material in at least one of the optical fibers 10 is not necessarily part of the method of testing a fiber optic cable 28. When it is determined that the difference in light transmission times is below or equal to the predetermined value, the fiber optic cable 28 is ready for use in the desired application. If the difference in light transmission times indicates an unacceptable amount of skew, the amount of optical material can be adjusted in the same manner as that described above in connection with the first preferred method.

Referring to FIG. 4, the preferred method of testing optical fibers 10 according to the present invention is as follows. In step S1, at least two optical fibers 10 are provided. In step S2, light is transmitted through the optical fibers 10. In step S3, light transmission times are measured for each of the optical fibers 10. In step S4, the difference in light transmission times is compared to a predetermined maximum skew value to determine whether the difference between the fastest light transmission time and the slowest light transmission time is above a predetermined value. If the difference in light transmission times is not above the predetermined value for a particular application, then, the optical fibers 10 are ready for use. If the difference in light transmission times is above a predetermined value, then, in step S5, the amount of optical fiber material in at least one of the optical fibers 10 is adjusted to reduce the difference in light transmission times. As described in detail above, optical fiber segments can be removed from at least one of the optical fibers 10 or additional optical fiber segments 18 may be added to one of the optical fibers 10 to reduce the difference in light transmission times.

Referring to FIGS. 1–3 and 5, the preferred method of testing a fiber optic cable 28 according to the present invention is as follows. In step S10, a fiber optic cable 28 is provided that includes at least two optical fibers 10. In step S11, light is transmitted through the optical fibers 10. In step S12, a light transmission time for each of the optical fibers 10 is measured. In step S13, the difference in the light transmission times is compared to a predetermined value to determine whether the difference exceeds the predetermined maximum skew value for a particular application. If the difference in light transmission times is not above the predetermined value, the fiber optic cable 28 is ready for use. If the difference in light transmission times is above the predetermined value, then the fiber optic cable is probably not ready for the desired application.

It will be recognized by those skilled in the art, that changes may be made to the above-described embodiments of the present invention without departing from the broad inventive concept thereof. It is understood, therefore, that this invention is not limited to the particular embodiments disclosed, but is intended to cover all modifications which are within the spirit and scope of the invention as defined by the appended claims.

What is claimed is:

1. A method of testing optical fibers, the method comprising:

providing at least two optical fibers;

transmitting a light at a first end of the at least two optical fibers;

measuring a light transmission time for each of the at least two optical fibers;

determining a difference in the light transmission times for the at least two optical fibers;

determining whether the difference in light transmission times is above a predetermined value; and if the difference in the light transmission times is above the predetermined value, adjusting an amount of optical material forming at least one of the at least two optical fibers to reduce the difference in the light transmission times, wherein the step of adjusting the amount of optical material comprises determining a length of an optical fiber segment to be added to one of the at least two optical fibers having a relatively shorter light transmission time as compared to another of the at least two optical fibers having a longest light transmission line, wherein the step of determining a length of an optical fiber segment comprises selecting an optical fiber segment having the same general index of refraction as the one of the at least two optical fibers being adjusted and having a length determined by: $X=(L/TT)\cdot \Delta T$ wherein:

X is the length of the optical fiber segment to be added to the one of the at least two optical fibers being adjusted;

L is the length of one of the at least two optical fibers being adjusted;

TT is the light transmission time of the one of the at least two optical fibers being adjusted: and $\Delta T$ is the time difference between the light transmission time of one of the at least two optical fibers being adjusted and the other of the at least two optical fibers having a longest light transmission time.

2. The method of claim 1, further comprising assembling the at least two optical fibers into a fiber optic cable.

3. The method of claim 1, wherein the step of transmitting light comprises transmitting light having a predetermined wavelength.

4. The method of claim 1, further comprising optically connecting a light signal generator to the first end of the at least two optical fibers.

5. The method of claim 1, further comprising optically connecting an optical detector to a second end of the at least two optical fibers.

6. The method of claim 1, further comprising optically connecting a second end of each of the at least two optical fibers to an optical detector.

7. The method of claim 1, wherein the step of adjusting the amount of optical material comprises determining a length of optical fiber to be removed from one of the at least two optical fibers having a relatively longer light transmission time as compared to another of the at least two optical fibers having the shortest light transmission time.

8. The method of claim 7, wherein the length of optical fiber to be removed from one of the at least two optical fibers is determined by: $X_R=(L/TT)\cdot \Delta T_2$ wherein:

$X_R$ is the length to be removed from the one of the at least two optical fibers;

L is the length of the one of the at least two optical fibers being adjusted;

TT is the light transmission time of the one of the at least two optical fibers being adjusted; and $\Delta T_2$ is the time difference between the light transmission time of the one of the at least two optical fibers being adjusted and another of the at least two optical fibers having a shortest light transmission time.

9. The method of claim 1, wherein the step of adjusting the amount of optical material comprises selecting a material for the optical fiber segment having a different index of refraction from the at least one of the at least two optical fibers being adjusted.

10. The method of claim 9, wherein the length of the optical fiber segment to be added to the one of the at least two optical fibers is determined by $X=c\cdot n_2\cdot \Delta T$ wherein:

X is the length of the optical fiber segment to be added to the one of the at least two fibers being adjusted;

c is the velocity of light in a vacuum;

$n_2$ is the group index of refraction of the optical fiber segment; and $\Delta T$ is the time difference between the light transmission time of the one of the at least two optical fibers being adjusted and the another of the at least two optical fibers having a longest light transmission time.

11. The method of claim 9, further comprising selecting the optical fiber segment for which the quantity $L_2/TT_2$, as measured using light having the same characteristics as that used to determine the light transmission times for the at least two optical fibers, is known such that the length of the optical fiber segment to be added to the one of the at least two optical fibers being adjusted is determined by: $X=(L_2/TT_2)\cdot \Delta T$ wherein:

X is the length of the optical fiber segment;

$L_2$ is a length of the optical fiber segment when the optical fiber segment is measured to determine the quantity $L_2/TT_2$;

$TT_2$ is the light transmission time of the optical fiber segment when the optical fiber segment is measured to determine the quantity $L_2/TT_2$; and $\Delta T$ is the time difference between the light transmission time of the one of the at least two optical fibers being adjusted and the another of the at least two optical fibers having a longest light transmission time.

12. The method of claim 9, wherein the step of adjusting the amount of optical material includes locating an anti reflective coating between the one of the at least two optical fibers being adjusted and the optical fiber segment.

13. A method of testing a fiber optic cable, the method comprising:

providing a fiber optic cable having a first and second end, the fiber optic cable comprising at least two optical fibers;

transmitting light at the first end of the fiber optic cable;

measuring a light transmission time for the light to travel through each of the at least two optical fibers of the fiber optic cable;

determining a difference in the light transmission times for the at least two optical fibers of the fiber optic cable;

determining whether the difference in the light transmission times is above a predetermined value;

adjusting an amount of optical material of at least one of the at least two optical fibers to reduce the difference in the light transmission times present in the fiber optic cable if the difference in the light transmission times is above the predetermined value; and adjusting an amount of optical material of at least one of the at least two optical fibers to reduce the difference in the light transmission times present in the fiber optic cable if the difference in the light transmission times is above the predetermined value, wherein the step of adjusting the amount of optical material comprises determining a length of an optical fiber segment to be added to one of the at least two optical fibers having a relatively shorter light transmission time as compared to another of the at least two optical fibers having the longest light transmission time, wherein the step of determining a length of the optical fiber segment comprises selecting an optical fiber segment having the same general index of refraction as one of the at least two optical fibers being adjusted and having a length determined by: $X=(L/TT) \cdot \Delta T$ wherein:

X is the length of the optical fiber segment to be added to the one of the at least two optical fibers being adjusted;

L is the length of the one of the at least two optical fibers being adjusted;

TT is the light transmission time of the one of the at least two optical fibers being adjusted; and $\Delta T$ is the time difference between the light transmission time of the one of the at least two optical fibers being adjusted and the another of the at least two optical fibers having a longest light transmission time.

14. The method of claim 13, wherein the step of adjusting the amount of optical material comprises selecting an optical fiber segment having a different index of refraction from that of the one of the at least two optical fibers being adjusted.

15. The method of claim 14, wherein the length of the optical fiber segment to be added to the one of the at least two optical fibers is determined by $X=c \cdot n_2 \cdot \Delta T$ wherein;

X is the length of the optical fiber segment to be added to the one of the at least two optical fibers being adjusted;

c is the velocity of light in a vacuum;

$n_2$ is the group index of refraction of the optical fiber segment; and $\Delta T$ is the time difference between the light transmission time of the one of the at least two optical fibers being adjusted and the another of the at least two optical fibers having a longest light transmission time.

16. The method of claim 14, further comprising selecting the optical fiber segment for which the quantity $L_2/TT_2$, as measured using light having the same characteristics as that used to determine the light transmission times for the at least two optical fibers, is known such that the length of the optical fiber segment to be added to the one of the at least two optical fibers is determined by: $X=(L_2/TT_2) \cdot \Delta T$ wherein;

X is the length of the optical fiber segment to be added to the one of the at least two optical fibers being added;

$L_2$ is a length of the optical fiber segment when the optical fiber segment is measured to determine the quantity $L_2/TT_2$;

$TT_2$ is the light transmission time of the optical fiber segment when the optical fiber segment is measured to determine the quantity $L_2/TT_2$; and $\Delta T$ is the time difference between the light transmission time of the one of the at least two optical fibers being adjusted and the another of the at least two optical fibers having a longest light transmission time.

17. The method of claim 13, wherein the step of transmitting light comprises transmitting light having a predetermined wavelength.

18. The method of claim 13, further comprising optically connecting a light signal generator to the first end of the fiber optic cable.

19. The method of claim 13, further comprising optically connecting an optical detector to the second end of the fiber optic cable.

20. The method of claim 13, further comprising optically connecting each of the optical fibers to an optical detector.

21. The method of claim 13, wherein the step of adjusting the amount of optical material comprises determining a length of optical fiber to be removed from the one of the at least two optical fibers having a relatively longer light transmission time as compared to another of the at least two optical fibers having the shortest light transmission time.

22. The method of claim 21, wherein the length of optical fiber to be removed from the at least one of the at least two optical fibers is determined by $X_R=(L/TT) \cdot \Delta T_2$ wherein:

$X_R$ is the length to be removed from the one of the at least two optical fibers;

L is the length of the one of the at least two optical fibers being adjusted;

TT is the light transmission time of the one of the at least two optical fibers being adjusted; and $\Delta T_2$ is the time difference between the light transmission time of the one of the at least two optical fibers being adjusted and another of the at least two optical fibers having a shortest light transmission time.

* * * * *